UNITED STATES PATENT OFFICE.

SAMUEL D. SHEPARD, OF ABINGTON, MASSACHUSETTS.

IMPROVEMENT IN FERTILIZING COMPOUNDS.

Specification forming part of Letters Patent No. 152,921, dated July 14, 1874; application filed June 19, 1874.

*To all whom it may concern:*

Be it known that I, SAMUEL D. SHEPARD, of Abington, of the county of Plymouth, of the State of Massachusetts, have invented a new and useful Composition for Fertilizing Land; and do hereby declare the same to be described as follows:

In preparing the composition, I take one hundred and twenty pounds of dry peat, fifteen gallons of cod-liver oil, and thirty gallons of fish-liver, from which the oil has been removed. I mix the whole thoroughly together, and expose it to the air, and stir or turn the mass over until the heat that may be generated in it may thoroughly escape, and the mass become dry.

The composition thus made can be employed to great advantage as a fertilizer. The reason I mix the oil with the liver in such proportions stated is, that in the liver in its natural state there is too much oil, and consequently to obtain the necessary amount of nitrogenous matter to the peat I must use more of the flesh of the liver.

I therefore claim—

As a new or improved manufacture, the fertilizing composition made of peat and fish oil and liver, as set forth, combined in, or about in, the proportions, and treated substantially as specified.

SAMUEL D. SHEPARD.

Witnesses:
R. H. EDDY,
J. R. SNOW.